United States Patent [19]

Yoshino et al.

[11] Patent Number: 4,959,672
[45] Date of Patent: Sep. 25, 1990

[54] MOTOR-DRIVEN FILM WINDER

[75] Inventors: Tsunemi Yoshino, Nara; Naoyuki Furutsuka, Kawabe; Naofumi Aoki, Takatsuki; Hiroshi Watanabe, Suita; Akitoshi Morioka, Kitakatsuragi, all of Japan

[73] Assignee: West Electric Company, Ltd., Osaka, Japan

[21] Appl. No.: 421,461

[22] Filed: Oct. 16, 1989

[30] Foreign Application Priority Data

Oct. 17, 1988 [JP] Japan ................. 63-260836

[51] Int. Cl.⁵ .............................. G03B 1/18
[52] U.S. Cl. ................... 354/173.1; 242/71
[58] Field of Search ........... 354/173.1, 173.11, 171; 242/71, 71.3, 71.4

[56] References Cited

U.S. PATENT DOCUMENTS 4,274,726 6/1981 Yoneyama et al. ........... 354/173.1
4,479,705 10/1984 Tamamura et al. ........... 354/173.1

FOREIGN PATENT DOCUMENTS 56-55925 5/1981 Japan .

Primary Examiner—Michael L. Gellner
Assistant Examiner—Khanh Dang
Attorney, Agent, or Firm—Cushman, Darby & Cushman

[57] ABSTRACT

A motor-driven film winder for a camera has an internal gear portion (5a) fixed to a motor (1), one or two step-shaped planet gears (7), (8) having first gears (7a), (8a) to mesh with a pinion gear (4) driven by the motor and the internal gear portion (5a) and second gears (7b), (8b) having a larger diameter than first gears (7a), (8b), and engaging with an internal gear (11a) provided on inside wall of the take-up spool (11), whereby rotation of the motor is transmitted to the take-up spool (11) with largely reduced speed of rotation and largely multiplied torque.

2 Claims, 4 Drawing Sheets

MOTOR-DRIVEN FILM WINDER

FIELD OF THE INVENTION AND RELATED ART STATEMENT

1. Field of the Invention

The present invention relates to a motor-driven film winder of spool drive type in which a film loaded in a camera is advanced by driving a winding spool directly.

2. Description of the Related Art

There are some kinds of types for winding a film loaded in a camera. One is a spool drive type, and another is a sprocket drive type. The sprocket drive type is that the film is advanced by being driven by a sprocket which engages with the perforation of the film. On the other hand, the spool drive type is that the film is advanced by rotation of a take-up spool driven by a motor.

The spool drive type is more simple in mechanism than a sprocket drive type. The reason is that the sprocket drive type requires an complicated inter connecting mechanism for driving both of the sprocket and the take-up spool. Further, as the film is taken up on the take-up spool, the diameter of the convolution of the film increases, hence gradually changing the advance of the film to be taken up on the spool for one revolution of the spool. Because of this, a complicated interconnecting mechanism for winding the constant length of the film to be taken up has been required. That is an adjustment mechanism for adjusting relation between rotation angles of the sprocket and the take-up spool.

On the contrary, the spool drive type in which the film is transported by driving the shaft of the take-up spool does not require the adjustment mechanism to control relation between the rotation angles of the sprocket and the spool, and the mechanical link between the sprocket and the spool.

Since a camera of lens-shutter type is required to be manufactured in small size and to be produced with low cost, in general, the spool drive type is common in the lens-shutter type camera. Recently, most cameras employ the spool drive type wherein a film is wound by a spool which is driven by a motor. The motor for driving the spool is usually arranged within the spool so as to achieve the small size camera. In the conventional spool type cameras, the driving torque of the motor is often transmitted to a gear provided outside of the spool, whereby to transmit the torque to the spool. Such a constitution has been disclosed, for example, in the U.S. Pat. No. 4,479,705.

Such a mechanism, however, comprises an interlock mechanism having complicated structure. Thus, it is the problem that the interlock mechanism for transmitting the torque to the spool must be arranged carefully when the members of it are mounted in the camera. In order to solve the problem, transmission of the driving torque of the motor to outside of the spool directly without such an interlocked mechanism has been proposed and disclosed, for instance, in the U.S. Pat. No. 4,274,726 and in Japanese Official Gazette of Unexamined Patent Publication No. Sho 56-55925.

The former, the U.S. Pat. No. 4,274,726 discloses an automatic film winder for camera which comprises a motor and a torque transmitting mechanism having a friction plate and gears, in which the film end is wound up on a spool, which is rotated by a frictional force. These mechanism are disposed within a cylindrical film winding member, such as an inner cylinder which is closely arranged to an internal face of a film spool. The driving torque of the motor is transmitted to an internal gear of the inner cylinder via the torque transmission mechanism. And, the film winding member is rotated in reduced speed with the spool.

In the automatic film winder, the driving torque of the motor is transmitted by a friction engagement means which uses a pressing member, and hence, a slide portion of the pressing member must be made of hard and abrasion resistive materials. Such hard materials for the pressing means are limited to some materials. Further, it is very difficult that the pressing member presses the spool always in stable manner. The pressure which is required to make the friction has a close influence with the driving state for rotating the spool. The pressing member is to be press-contacted to a driven member fixed to the rotating spool with a properly predetermined pressure, and it is not easy that the proper predetermined pressure to meet natures of the various kinds of materials and abrasion durability rate thereof. Furthermore, in this automatic film winder, the efficiency of the driving torque of the motor is not high because the system uses the friction means which makes energy loss.

On the other hand, the film transportation device in a camera in Japanese Official Gazette of Unexamined Patent Publication No. Sho 56-55925 comprises a motor wherein motor case serves as a spool and a speed reduction gear structure. The speed reduction gear structure comprises a sun gear which is mounted to the motor shaft, a planetary gear, a first ring gear which is fixed on the motor case as the spool, and a second ring gear which is fixed on a disc for produce of the torque. In the above-mentioned structure of the film transportation device, the revolution force the driving shaft of the motor is transmitted to the spool through the speed reduction gear structure. The spool as the motor case with the first ring gear is rotated because of the disc which is fixed on the camera case. The above-mentioned film transportation device, however, must provide a complicated commutator and sliding contacts for supplying electric power to a motor which is disposed within the spool, because the motor case serving as the spool rotate. And, such complicated commutator and sliding contact mechanism is liable to trouble, and lead to increase of production cost.

OBJECT AND SUMMARY OF THE INVENTION

An object of the present invention is to provide a motor-driven film winder of spool drive type which is small in the bulk and size as a whole and inexpensive in manufacture, and has reliable and simple configuration.

In order to achieve the above-mentioned objects, the motor-driven film winder of the present invention comprises:

a take-up spool having a hollow cylindrical shape, which is rotatably arranged within a body frame of a camera;

a motor which is arranged in the take-up spool, and which is fixed to the body frame of the camera;

a pinion gear which is fixed to a output shaft of the motor;

an internal gear which is fixed to the motor;

at least one planet gear having a stepped shape, which comprises a first gear to mesh with both of the pinion gear and an internal gear portion of the internal gear, and a second gear having larger diameter than the first gear; and an internal gear 11a which is provided on an internal circumference of the take-up spool to mesh with the second gear.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

First embodiment

Hereafter, preferred a first embodiment of the present invention are described with reference to the accompanying drawings of FIG. 1 and FIG. 2.

Figure 1:
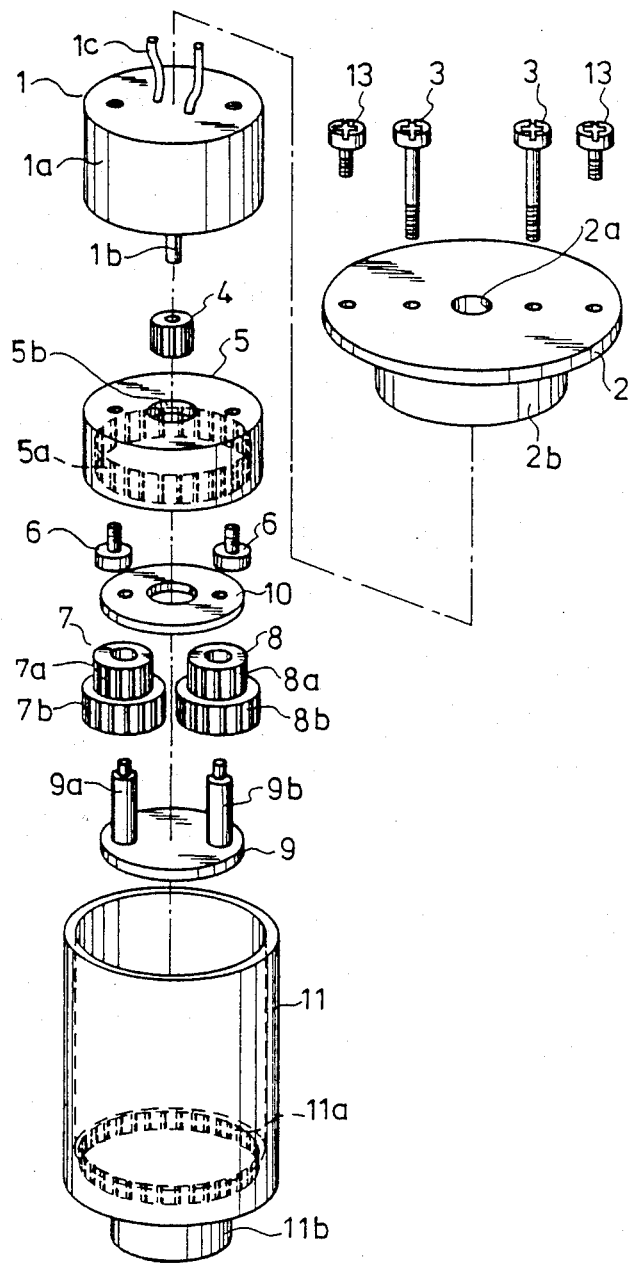
FIG. 1 is an exploded perspective view showing components of a first embodiment of a motor-driven film winder of the present invention.
Figure 2:
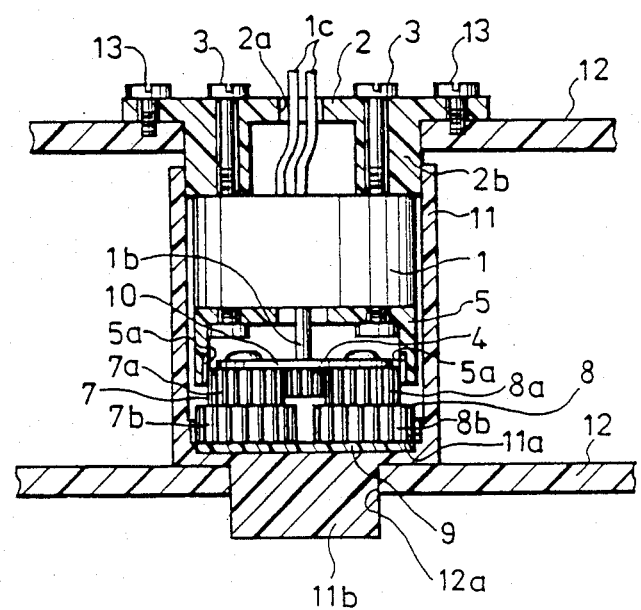
FIG. 2 is a vertical sectional view showing the main components shown in FIG. 1.

FIG. 1 is an exploded perspective view showing components of the first embodiment of the present invention. FIG. 2 is a sectional elevation view showing the components shown in FIG. 1.

As the drawings show, a motor case 1a of a motor 1 is fixed to a bottom face of a projection 2b of a motor base 2 by bolts 3, 3. The motor base 2 is fixed to body frame 12 of a camera by bolts 13, 13, shown in FIG. 2.

In the vertical center portion of the motor base 2, a through-hole 2a is provided to pass power feed wires 1c, 1c to the motor 1. The projection 2b on which the motor 1 is mounted serves as a rotation shaft for a take-up spool 11 which is elucidated later.

A pinion gear 4 is set to an output shaft 1b of the motor 1. The output shaft 1b is projected from substantial center of a bottom face of the motor case 1a. An internal gear 5 having an internal gear portion 5a on an internal circumference face thereof is fixed by bolts 6, 6 to the bottom face of the motor case 1a. In the substantial center portion of the internal gear 5, a through-hole 5b is provided for passing the output shaft 1b and the pinion gear 4.

Two planet gears 7, 8 are rotatably provided on two rotation shafts 9a, 9b fixed to a rotation plate 9, respectively. The rotation plate 9 is rotatably placed on a bottom face in the take-up spool 11. The planet gears 7, 8 are rotatably held on the rotation plate 9 by the rotation shafts 9a, 9b and a shaft receiving plate 10, which is mounted on the upper end of the rotation shafts 9a, 9b. Planet gears 7, 8 have first gear 7a, 8a, respectively, which meshes with the pinion gear 4 and with the internal gear portion 5a of the internal gear 5, and also have second gear 7b, 8b, respectively, which meshes with an internal gear 11a of a take-up spool 11 which is mentioned later. The inner diameter of the internal gear 11a is larger than that of the internal gear portion 5a. The diameter of the first gears 7a, 8a is smaller than the diameter of the second gears 7b, 8b. The diameters of gears are properly determined in consideration of the driving torque of the motor 1 and the required reduction ratio of rotation speed of the take-up spool 11.

The take-up spool 11 which is formed in cylindrical hollow shape contains therein the motor 1, the planet gears 7, 8, the rotation plate 9 which supports the planet gears 7, 8 and the shaft receiving plate 10. The above-mentioned internal gear 11a of the take-up spool 11 is provided on a bottom side of an internal circumference face of the take-up spool 11 to mesh with the second gears 7b, 8b of the planet gears 7, 8. And, a projection 11b is provided on the underneath end of the take-up spool 11. The take-up spool 11 is rotatably supported by the body frame 12 in a manner that the projection 11b of the take-up spool 11 is inserted in the throughout hole 12a of the body frame 12 of the camera, as shown in FIG. 2.

Next, operation of the above-mentioned mechanism of the first embodiment of the present invention is described.

The motor 1 is energized by electric power from a power supply unit (not shown) through the wires 1c, 1c. Since the motor case 1a of the motor 1 is secured to the motor base 2 which is fixed to the body frame 12 of the camera, the output shaft 1b of the motor 1 drives the pinion gear 4. As the pinion gear 4 is meshed with the first gears 7a, 8a of the respective planet gears 7, 8, the planet gears 7, 8 are rotated on the pinion gear 4. At the time, the planet gears 7, 8 spin on the rotation shafts 9a, 9b, respectively. Since the planet gears 7, 8 are meshed with the internal gear portion 5a of the internal gear 5 fixed on the motor case 1, the rotation shafts 9a, 9b of the planet gear 7, 8 and the rotation plate 9, hence, the shaft receiving plate 10 are rotated around the output shaft 1b of the motor 1. That is, the planet gear 7, 8 slowly rotate around the pinion gear 4.

Since the integral step-shaped planet gears 7, 8 have the first gears 7a, 8a of smaller diameter and the second gear 7b, 8b of larger diameter, the rotations of the first gears 7a, 8a causes slower speed rotation of the internal gear 11a fixed on the take-up spool 11. Thus, the rotation of the motor shaft 1b is transmitted to the take-up spool 11, changing the rotation speed. And, the take-up spool 11 is accurately and stably rotated by the gear-multiplied driving torque of the motor 1.

Although the first embodiment of the motordriven film winder comprises a pair of step-shaped gears as planet gears 7, 8 for the sake of smoothness of motion, at least one step-shaped gear as planet gear can serve the same function.

One example of the embodiment is as follows:

| | |
|---|---|
| number of teeth of the pinion 4 | 8 |
| number of teeth of the first gears 7a, 8a | 21 |
| number of teeth of the internal gear portion 5a | 50 |
| number of teeth of the second gears 7b, 8b | 21 |
| number of teeth of the internal gear 11a | 48 |

| -continued | |
|---|---|
| rotation speed of the motor shaft 1b | 6,700 rpm |
| rotation speed of the take-up spool 11 | 38.5 rpm |
| reduction ratio from the rotation of the motor shaft 1b to the take-up spool 11 | 174:1 |

As mentioned above in the first embodiment, the motor 1 which is fixed to the body frame 12 of the camera is arranged inside the hollow take-up spool 11, and the driving force of the output shaft 1b of the motor 1 is transmitted as rotation of multiplied torque and reduced speed to the internal gear 11a which is provided on the internal circumference face of the take-up spool 11. This is achieved by use of the integral step-shaped planet gear 7, 8 and two internal gears 5a and 11a which are arranged on the inside walls of the internal gear 5 fixed to the motor housing and the take-up spool 11, respectively. The motor-driven film winder of the embodiment does not require a slipping mechanism, such as a sliding collector for supplying power to the motor 1 or friction plate, which are less stable than gear. Since all of the driving force of the motor 1 can be transmitted to the take-up spool 11 by compact mechanism contained in the take-up spool 11, the camera can be made compact and simple at a low cost.

Second embodiment

Figure 3:
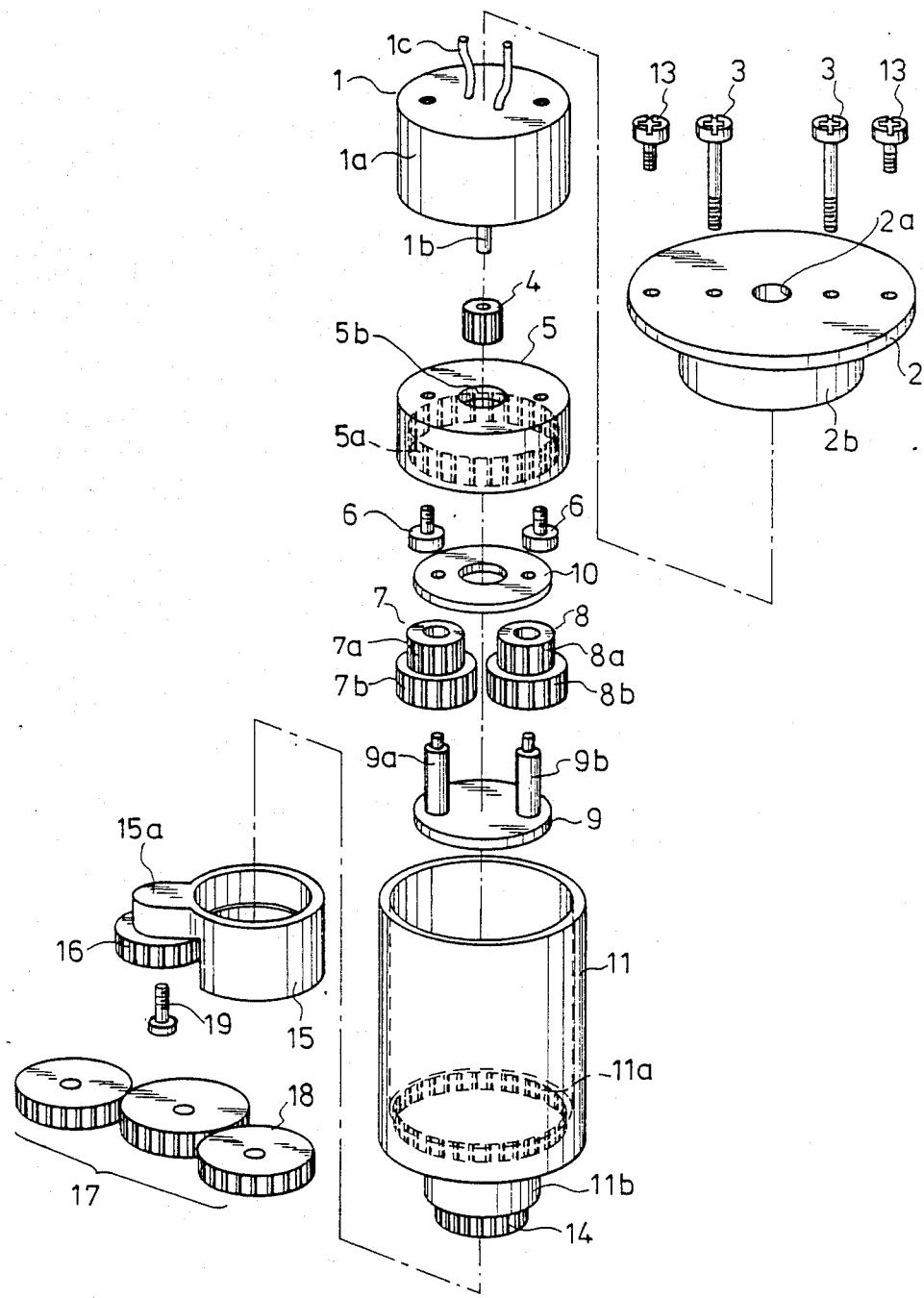
FIG. 3 is an exploded perspective view showing a second embodiment of a motor-driven film winder of the present invention.
Figures 4, 5:
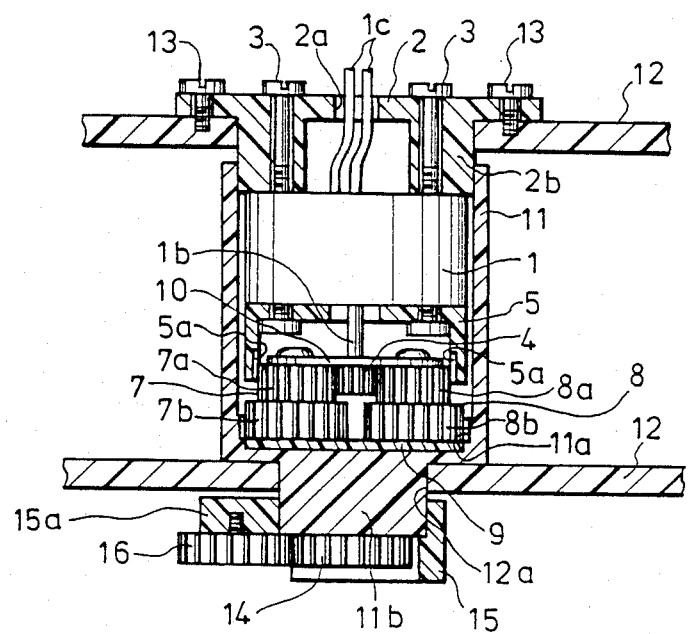
FIG. 4 is a vertical sectional view showing the main components shown in FIG. 3
FIG. 5 is a bottom view showing some components shown in FIG. 3.

FIG. 3 is an exploded perspective view showing a second embodiment of a motor-driven film winder of the present invention. FIG. 4 is a vertical sectional view showing the components shown in FIG. 3. FIG. 5 is a bottom view showing some components shown in FIG. 3.

As FIG. 3 shows, the motor-driven film winder of the second embodiment has further structure in addition to the first embodiment.

Corresponding parts and components to the first embodiment are shown by the same numerals and marks, and the description thereon made in the first embodiment similarly apply. Differences and features of this second embodiment from the first embodiment are as follows.

An external gear 14 is formed on the bottom portion of the projection 11b of the take-up spool 11. A cylindrical lever 15 is mounted rotatably on the outside face of the projection 11b so as to cover the external gear 14. A driven gear 16 is rotatable provided on a support portion 15a which is formed on the cylindrical lever 15 integrally, so that the driven gear 16 is meshed with the external gear 14. The rotation angle of the cylindrical lever 15 is limited between an engagement position where the driven gear 16 meshes with a first gear 18 of a gear train 17 and the free position where the driven gear 16 journaled on the cylindrical lever 15 is disengaged from the first gear 18 and the support portion 15a is stopped by a stopper pin 161. The stopper pin 161 is provided near the cylindrical lever 15 so as to contact with the support portion 15a.

FIG. 5 which is the bottom view shows the arrangements of the driven gear 16 and the first gear 18 of the gear train 17. In a first mode where the cylindrical lever 15 is rotated in a direction indicated by arrow A by rotation of the external gear 14 in the same direction (arrow A), the cylindrical lever 15 is stopped at the position since the support portion 15a contacts the stopper pin 161. Thereby, the driven gear 16 is free from any gear of the gear train 17. In this first mode the external gear 14 is rotated in the direction (arrow A), and the film loaded in the camera is wound by the take-up spool 11. On the contrary, when the cylindrical lever 15 is rotated in a direction indicated by arrow B by rotation of the external gear 14 in the direction of arrow B, the cylindrical lever 15 is stopped its further rotation at the engagement position since the driven gear 16 engages with the first gear 18 of the gear train 17. Thus the cylindrical lever 15 is not rotated counterclockwise over the engagement position.

Next, operation of the above-mentioned motor-driven film winder of the second embodiment is described.

The driving torque of the motor 1 is transmitted to the take-up spool 11 to revolute the take-up spool 11 as described in the first embodiment.

When the take-up spool 11 is rotated in a direction indicated by arrow A by the driving torque of the motor 1, the rotation force of the take-up spool 11 is transmitted to the cylindrical lever 15 by engagement between the external gear 14 of the take-up spool 11 and the driven gear 16 of the cylindrical lever 15 and the like. As a result, the cylindrical lever 15 is rotated with the take-up spool 11 in a direction indicated by the arrow A. And, the cylindrical lever 15 is stopped when the support portion 15a of the cylindrical lever 15 contacts the stopper pin 161 for regulating rotation range at the free position. By the rotation in the direction (arrow A) of the cylindrical lever 15, the driven gear 16 is moved to leave the first gear 18.

In the above-mentioned state of free position, the rotation hence the driving torque of the take-up spool 11 is not transmitted to the gear train 17.

On the contrary, when the take-up spool 11 is rotated in the direction indicated by arrow B by reverse driving of motor 1, the cylindrical lever 15 is moved in a direction indicated by arrow B to the engagement position. As a result, the driven gear 16 is moved to engage with the first gear 18.

In the engagement position of the cylindrical lever 15, the driving torque of the motor 1 in reverse is transmitted to the gear train 17 including the first gear 18 through the external gear 14 and driven gear 16. Accordingly, the above-mentioned mechanism of the second embodiment can transmit the revolution force of the take-up spool 11 to other mechanism.

For example, by driving position of a fork (not shown) for rewinding a film by the gear train 17 in a direction of rewinding, a film can be rewinded by rotating the take-up spool 11 in the direction indicated by arrow B. Or alternatively, by rotating the take-up spool 11 in the direction indicated by arrow A, the film can be wound up. Therefore, the above-mentioned mechanism of the second embodiment can be effectively used the driving torque of the motor 1 in forward or reverse.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A motor-driven film winder comprising:

a spool having a hollow cylindrical shape, which is rotatably arranged within a body frame of a camera;

a motor which is arranged in said spool, and which is fixed to said body frame of said camera;

a pinion gear which is fixed to a output shaft of said motor;

an internal gear which is fixed to said motor;

at least one planet gear having a stepped shape, which comprises a first gear to mesh with both of said pinion gear and an internal gear portion of said internal gear, and a second gear having larger diameter than said first gear; and an internal gear 11a which is provided on an internal circumference face of said spool to mesh with said second gear.

2. A motor-driven film winder in accordance with claim 1 further comprising:

an external gear which is formed on an external circumference of said spool;

a cylindrical lever which is held rotatable around the axis of said take-up spool and rotatably supports a driven gear, which is meshed with said external gear; and a gear train including a gear which is to be meshed with said driven gear when said cylindrical lever is at a first position rotated on said spool to take out revolution force of said spool by meshing between said driven gear and said gear.

* * * * *